United States Patent
Owen et al.

(10) Patent No.: US 11,651,305 B2
(45) Date of Patent: May 16, 2023

(54) ACHIEVING FEASIBILITY OF OPTIMIZATION CONSTRAINTS

(71) Applicant: Kalibrate Technologies Limited, Manchester (GB)

(72) Inventors: Gareth Owen, Manchester (GB); Benjamin Pickering, Manchester (GB); David Leedal, Manchester (GB)

(73) Assignee: Kalibrate Technologies Limited, Manchester (GB)

( * ) Notice: Subject to any disclaimer, the term of this patent is extended or adjusted under 35 U.S.C. 154(b) by 164 days.

(21) Appl. No.: 16/807,467

(22) Filed: Mar. 3, 2020

(65) Prior Publication Data

US 2022/0391375 A1 Dec. 8, 2022

(51) Int. Cl.
*G06Q 10/06* (2012.01)
*G06Q 10/04* (2012.01)
*G06Q 10/0631* (2023.01)

(52) U.S. Cl.
CPC ......... *G06Q 10/0631* (2013.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 7,568,155 B1 * | 7/2009 | Axe | ........................ | G06F 30/00 |
| | | | | 715/244 |
| 7,809,581 B1 * | 10/2010 | Neal | ...................... | G06Q 30/02 |
| | | | | 705/400 |

(Continued)

FOREIGN PATENT DOCUMENTS

| WO | 2016/083980 A1 | 6/2016 | | |
|---|---|---|---|---|
| WO | WO-2016083980 A1 * | 6/2016 | ......... | G06Q 10/0631 |

OTHER PUBLICATIONS

Amaldi et al, On the maximum feasible subsystem problem, IISs and IIS-hypergraphs, Mathematical Programming, 95_3, pp. 533-554, Mar. 2003 https://link.springer.com/article/10.1007/s10107-002-0363-5 (Year: 2003).*

(Continued)

*Primary Examiner* — Octavian Rotaru
(74) *Attorney, Agent, or Firm* — Michael Best & Friedrich LLP (57) ABSTRACT

Systems and methods of achieving feasibility of optimization constraints. One system includes an electronic processor configured to receive a request associated with an original set of constraints and determine an irreducible infeasible subset (IIS) of the original set of constraints. The electronic processor is also configured to remove the IIS from the original set of constraints resulting in a subset of remaining constraints of the original set of constraints. The electronic processor is also configured to remove a constraint from the IIS resulting in a feasible subset of remaining constraints of the IIS. The electronic processor is also configured to determine a new set of constraints, the new set of constraints including the subset of remaining constraints of the original set of constraints and the feasible subset of remaining constraints of the IIS. The electronic processor is also configured to output a result based on the new set of constraints.

12 Claims, 3 Drawing Sheets

(56) References Cited

U.S. PATENT DOCUMENTS

| | | | | |
|---|---|---|---|---|
| 7,877,333 | B2* | 1/2011 | Macready | G06N 7/08 |
| | | | | 706/52 |
| 8,412,551 | B2* | 4/2013 | Feng | G06Q 10/06314 |
| | | | | 706/12 |
| 8,645,310 | B2* | 2/2014 | Jiang | G06F 30/3323 |
| | | | | 706/58 |
| 9,424,526 | B2* | 8/2016 | Ranjbar | G06N 10/00 |
| 10,176,433 | B2* | 1/2019 | Hastings | G06N 20/00 |
| 10,346,748 | B2* | 7/2019 | Aspuru-Guzik | G06N 5/003 |
| 2004/0236812 | A1* | 11/2004 | Stein | G06F 7/726 |
| | | | | 708/492 |
| 2008/0065573 | A1* | 3/2008 | Macready | G06N 7/08 |
| | | | | 706/19 |
| 2008/0134193 | A1* | 6/2008 | Corley | G06Q 10/04 |
| | | | | 718/104 |
| 2013/0085660 | A1* | 4/2013 | Wang | G08G 5/0043 |
| | | | | 701/120 |
| 2016/0148291 | A1* | 5/2016 | Andersson | G06Q 10/06315 |
| | | | | 705/26.35 |
| 2019/0333093 | A1 | 10/2019 | Zhang et al. | |

OTHER PUBLICATIONS

Chinneck JW, Finding a useful subset of constraints for analysis in an infeasible linear program, INFORMS Jour on Comput, 9_2, pp. 164-174, May 1997 https://pubsonline.informs.org/doi/abs/10.1287/ijoc.9.2.164 (Year: 1997).*

Guieu et al, Analyzing infeasible mixed-integer and integer linear programs, INFORMS Journal Computing,11_1, p. 63-77,1999 https://pubsonline.informs.org/doi/abs/10.1287/ijoc.11.1.63 (Year: 1999).*

Joormann et al, A characterization of irreducible infeasible subsystems in flow networks, publication titled Networks, pp. 121-129, Sep. 2016 https://dspace.mit.edu/bitstream/handle/1721.1/111098/Flow-Networks-iis-James-Orlin.pdf?sequence=1&isAllowed=y (Year: 2016).*

Omer et al, Identifying relatively irreducible infeasible subsystems of linear inequalities, Annals of Operations Research, pp. 1-19, May 26, 2021 https://link.springer.com/article/10.1007/s10479-021-04126-9 (Year: 2021).*

Tanner et al, IIS branch-and-cut for joint chance-constrained programs with random technology matrices, Eur J Oper Res, 207_1, pp. 290-296, 2010 http://citeseerx.ist.psu.edu/viewdoc/download?doi=10.1.1.483.5768&rep=rep1&type=pdf (Year: 2010).*

Tanner et al, IIS branch-and-cut for joint chance-constrained stochastic programs and application to optimal vaccine allocation, Nov. 2010 https://www.sciencedirect.com/science/article/pii/S0377221710003383?via%3Dihub (Year: 2010).*

Tanner et al, IIS Cuts for Stochastic Programs with Joint Chance Constraints, 2008 https://www.semanticscholar.org/paper/IIS-Cuts-for-Stochastic-Programs-with-Joint-Tanner-Ntaimo/898327575669de5306e94482bb4d0f608365ee40 (Year: 2008).*

Yang, Jian, Infeasibility resolution based on goal programming, Computers and operations research 35_5, pp. 1483-1493, 2008 https://www.sciencedirect.com/science/article/pii/S0305054806001924?via%3Dihub (Year: 2008).*

International Search Report with Written Opinion for related Application No. PCT/IB2021/051737 dated May 4, 2021 (13 Pages).

* cited by examiner

ACHIEVING FEASIBILITY OF OPTIMIZATION CONSTRAINTS

TECHNICAL FIELD

Embodiments described herein relate to systems and methods of achieving feasibility of optimization constrains to, for example, reduce the complexity and related processing time and resource usage when achieving feasibility of optimization constraints.

SUMMARY

In the context of mathematical optimization, a set of linear constraints or rules may represent one or more boundaries to the optimization variables that a user would like to adhere to. A set of linear constraints is feasible when, for example, there is at least one value that all the optimization parameters may take while satisfying all linear constraints included in the set of linear constraints. However, when a set of linear constraints is infeasible (e.g., even using a computer or other automated mechanisms), it is desirable to find a method of removing one or more constraints until the remaining set of constraints is feasible. When a set of constraints is infeasible, it is useful to determine an Irreducible Infeasible Subset ("IIS"). An IIS is a subset of the constraints that is itself infeasible but may be made feasible by removing any single constraint of the subset.

One conventional approach to determining feasibility of a set of constraints (or rules) includes removing only a minimum number of constraints necessary to make the set of constraints feasible. However, given the potentially large number of constraints, such an approach is impractical from a computational perspective. For example, the conventional approach requires finding every IIS, and then determining a minimum possible number of constraints to remove. Accordingly, the feasibility of O ($2^n$) subsets of constraints would need to be checked ($2^n$ coming from the total number of subsets of a set with n elements). In other words, the conventional approach considers every possibility, which increases complexity and related processing time and resource usage. For example, storing every possibility would result in an increased usage of memory.

Such optimization is useful in many different applications and industries. For example, within the context of the fuel retail industry, the task of identifying the most appropriate price points to achieve business objectives given market conditions and fuel retailer(s) own overall pricing strategy is a challenge faced by all fuel retailers. Often a retailer will not only wish to ensure a minimum margin is achieved on all sales but also desire to price competitively against rival brands. For example, a given station of a mid-market retailer may wish to price lower than the premium brands in the local area but be a certain amount higher than the price of the loss-leading stations of nearby grocery supermarkets. In addition to this, the retailer may wish to impose a maximum price value, to ensure that a certain level of sales is maintained. Each of these constraints may have differing levels of priority.

The result of these different pricing constraints may include, for example, a set of multiple constraints which the price of a fuel product is desired to satisfy when being updated. Due to the competitive nature of the fuel retail market, the profit margins are low and the price variations between retailers are small (relative to cost). As such, the pricing constraints desired by a retailer are often conflicting, and, thus, in many cases, it is not possible to satisfy all of the desired pricing constraints simultaneously when generating a price. As a result, a retailer must identify a set of pricing constraints that feasibly allow a price to be generated, whilst attempting to ensure that the higher-priority constraints are maintained as much as possible. Alternatively or in addition, in many cases, fuel retailers have hundreds or thousands of sites, where each site may have its own unique set of pricing constraints.

To address these and other problems, embodiments described herein provide methods and systems of achieving feasibility of optimization constraints with increased efficiency while still providing good performance on a particular class of constraint sets. For example, the embodiments described herein achieve feasibility of optimization constraints such that, in a worst case scenario, such as where every IIS consists of only two constraints and multiple computation steps are repeated the maximum number of times, only O (n ($\log_2$ n)$^2$) feasibility checks may be needed.

Accordingly, embodiments described herein provide methods and systems of achieving feasibility of optimization constraints with increased efficiency while still providing good performance on a particular class of constraint sets by, for example, utilizing or leveraging linear constraints, disjoint constraints, or a combination thereof. The linearity of the constraints allows for the formulation of an augmented linear programming problem, which may enable the efficient checking of feasibility of a given collection of constraints. In the context of the fuel industry, fuel pricing constraints are generally linear in nature. For example, fuel pricing constraints are generally such that the price is required (according to the constraint) to be above or below the sum of multiples of one or more variables, such as cost (for a minimum margin constraint) or prices of competitors in the local market (for brand image constraints).

Alternatively or in addition, disjointedness between constraints means that one partition of the constraints (which typically corresponds to the constraints relating to a single product) rarely interacts with constraints in another partition. In other words, infeasibility is generally confined within a partition. Hence, removing an IIS from a set of constraints very often means that a source of infeasibility is removed, and is far more efficient than a naïve brute-force approach, which will still consider all other subsets containing the constraints in this IIS. For example, when the constraints are mostly disjoint, the conventional approach is inefficient given that when an IIS is determined, all other subsets containing the constraints in that IIS still need to be considered. Therefore, with respect to the embodiments described herein, when the constraints are mostly disjoint, determining an IIS and then considering only the constraints left over is far more efficient. Further, consideration of a priority value for each constraint in an IIS when determining which constraint to drop from the IIS means that a retailer's pricing strategy is adhered to whilst ensuring feasibility. In the context of the fuel industry, pricing constraints may be grouped into largely disjoint sets relating to different fuel products at the site. This is generally because the pricing constraints for a product typically only relate to the prices of equivalent products at competing sites, or its own cost. In the space of the optimization variables (the own prices), this leads to a set of constraints that affect only a single variable. For example, when a retailer is pricing an unleaded product it will often only consider the prices of competitors' unleaded products in the local area (and not, for example, competitors' diesel products).

For example, some embodiments provide a system of achieving feasibility of optimization constraints. The system includes an electronic processor configured to receive a request associated with an original set of constraints and determine an irreducible infeasible subset of the original set of constraints. The electronic processor is also configured to remove the irreducible infeasible subset from the original set of constraints resulting in a subset of remaining constraints of the original set of constraints. The electronic processor is also configured to remove a constraint from the irreducible infeasible subset resulting in a feasible subset of remaining constraints of the irreducible infeasible subset. The electronic processor is also configured to determine a new set of constraints, where the new set of constraints includes the subset of remaining constraints of the original set of constraints and the feasible subset of remaining constraints of the irreducible infeasible subset. The electronic processor is also configured to output a result based on the new set of constraints.

Other embodiments provide a method of achieving feasibility of optimization constraints. The method includes receiving, with an electronic processor, a request associated with an original set of constraints. The method also includes determining, with the electronic processor, a first irreducible infeasible subset of the original set of constraints. The method also includes removing, with the electronic processor, the first irreducible infeasible subset from the original set of constraints resulting in a first subset of remaining constraints of the original set of constraints. The method also includes determining, with the electronic processor, a second irreducible infeasible subset of the first subset of remaining constraints. The method also includes removing, with the electronic processor, the second irreducible infeasible subset from the first subset of remaining constraints resulting in a second subset of remaining constraints of the first subset of remaining constraints. The method also includes removing, with the electronic processor, a first constraint from the first irreducible infeasible subset resulting in a first feasible subset of remaining constraints of the first irreducible infeasible subset. The method also includes removing, with the electronic processor, a second constraint from the second irreducible infeasible subset resulting in a second feasible subset of remaining constraints of the second irreducible infeasible subset. The method also includes determining, with the electronic processor, a new set of constraints, where the new set of constraints includes the first subset of remaining constraints, the second subset of remaining constraints, the first feasible subset of remaining constraints, and the second feasible subset of remaining constraints. The method also includes outputting, with the electronic processor, a result based on the new set of constraints.

Still other embodiments provide non-transitory computer-readable medium storing instructions executable by at least one electronic processor to perform a set of functions. The set of functions includes receiving a request associated with an original set of constraints. The set of functions also includes, in response to determining that the original set of constraints is infeasible, determining an irreducible infeasible subset of the original set of constraints, removing the irreducible infeasible subset from the original set of constraints resulting in a subset of remaining constraints of the original set of constraints, removing a constraint from the irreducible infeasible subset resulting in a feasible subset of remaining constraints of the irreducible infeasible subset, determining a new set of constraints, where the new set of constraints includes the subset of remaining constraints and the feasible subset of remaining constraints, and outputting a first result based on the new set of constraints.

BRIEF DESCRIPTION OF THE DRAWINGS

Embodiments will now be described, by way of example, with reference to the accompanying drawings, in which.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
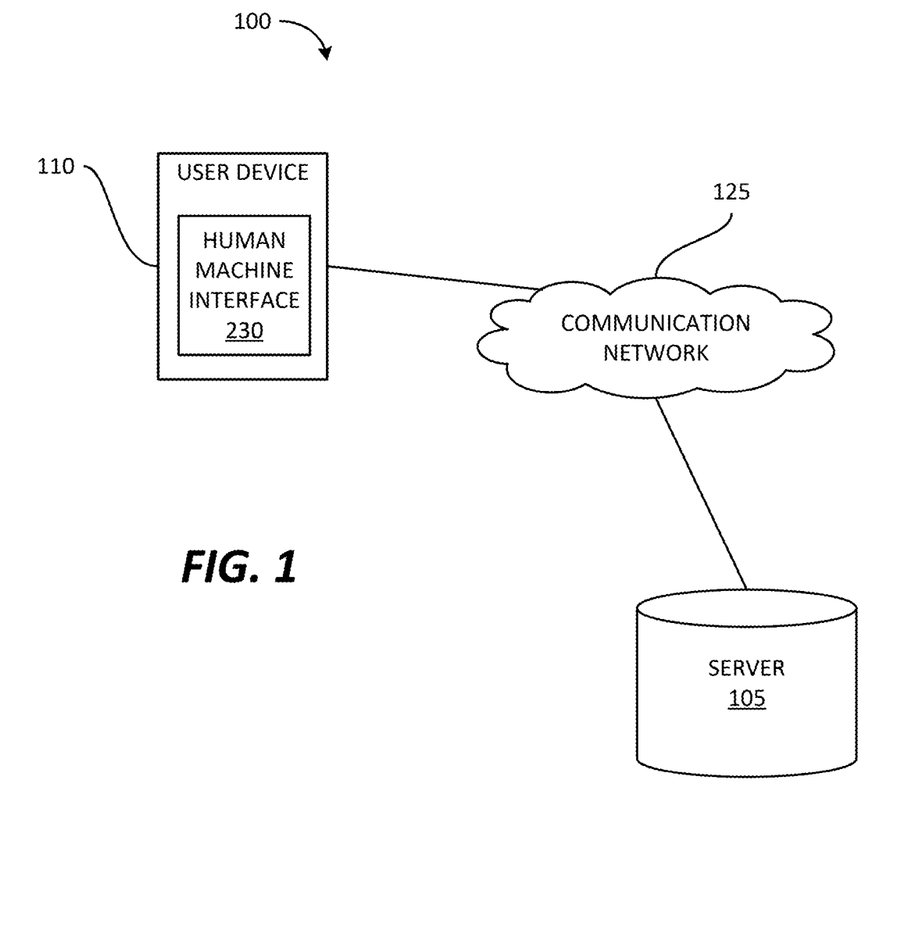
FIG. 1 illustrates a system of achieving feasibility of optimization constraints according to some embodiments.

FIG. 1 schematically illustrates a system 100 of achieving feasibility of optimization constraints according to some embodiments. The system 100 includes a server 105 and a user device 110. In some embodiments, the system 100 includes fewer, additional, or different components than illustrated in FIG. 1. For example, the system 100 may include multiple servers 105, multiple user devices 110, or a combination thereof. Also, in some embodiments, the server 105 and the user device 110 may be combined into a single device or server. In other embodiments, one or more of the server 105 and the user device 110 are distributed among multiple devices or servers.

The server 105 and the user device 110 communicate over one or more wired or wireless communication networks 125. Portions of the communication networks 125 may be implemented using a wide area network, such as the Internet, a local area network, such as a Bluetooth™ network or W-Fi, and combinations or derivatives thereof. It should be understood that in some embodiments, additional communication networks may be used to allow one or more components of the system 100 to communicate. Also, in some embodiments, components of the system 100 may communicate directly as compared to through a communication network 125 and, in some embodiments, the components of the system 100 may communicate through one or more intermediary devices not shown in FIG. 1.

Figure 2:
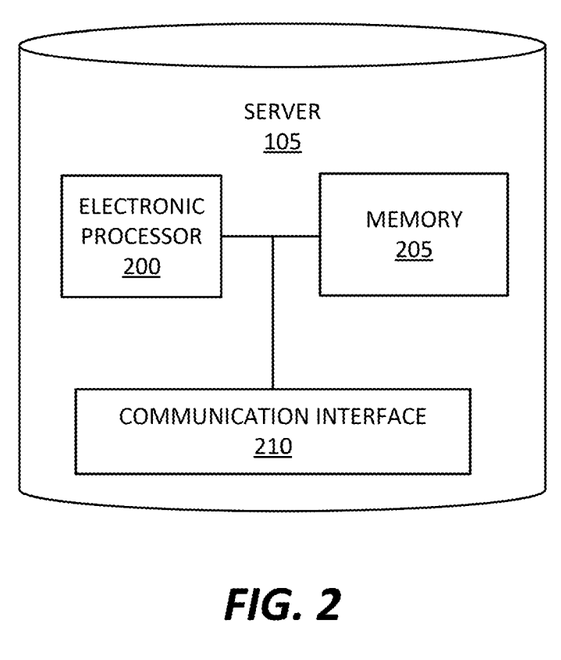
FIG. 2 illustrates a server of the system of FIG. 1 according to some embodiments.

The server 105 may be a computing device (for example, a desktop computer, a terminal, a workstation, a laptop computer, a tablet computer, or the like). As illustrated in FIG. 2, the server 105 includes an electronic processor 200 (for example, a microprocessor, an application-specific integrated circuit (ASIC), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. It should be understood that the server 105 may include additional components than those illustrated in FIG. 2 in various configurations and may perform additional functionality than the functionality described herein. For example, in some embodiments, the functionality (or a portion thereof) described herein as being performed by the server 105 may be distributed among servers or devices (including as part of services offered through a cloud service).

The communication interface 210 allows the server 105 to communicate with devices external to the server 105. For example, as illustrated in FIG. 1, the server 105 may communicate with the user device 110 through the communication interface 210. The communication interface 210 may include a port for receiving a wired connection to an external device (for example, a universal serial bus ("USB") cable and the like), a transceiver for establishing a wireless connection to an external device (for example, over one or more communication networks 125, such as the Internet, local area network ("LAN"), a wide area network ("WAN"), and the like), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

The user device 110 is a computing device and may include a desktop computer, a terminal, a workstation, a laptop computer, a tablet computer, a smart watch or other wearable, a smart television or whiteboard, or the like. Although not illustrated, in some embodiments, the user device 110 includes similar components to the server 105 (for example, a communication interface, a memory, and an electronic processor). In other embodiments, the user device 110 includes more or less components than the server 105. For example, as illustrated in FIG. 1, the user device 110 may include a human-machine interface 230 for interacting with a user. The human-machine interface 230 may include one or more input devices, one or more output devices, or a combination thereof. For example, the human-machine interface 230 may include a keyboard, a cursor-control device (for example, a mouse), a touch screen, a scroll ball, a mechanical button, a display device (for example, a liquid crystal display ("LCD")), a printer, a speaker, a microphone, or a combination thereof. In some embodiments, the user device 110 is combined with the server 105.

A user may use the user device 110 to implement optimization. For example, a user may interact with optimization software (for example, a decision support tool, a price optimization application, another type of optimization application, or a combination thereof) through one or more user interfaces that may prompt the user to input various data and may provide data to the user. In some embodiments, the optimization software is stored in a memory of the user device 110. In other embodiments, the optimization software is stored in the memory 205 of the server 105. Accordingly, in such embodiments, the optimization software may be a hosted service offered by a third-party provider. The user may interact with the optimization software (via the user device 110) by accessing the optimization software and using the optimization software to define (or provide) an optimization problem (for example, a linear programming problem). In some embodiments, the user also interacts with the optimization software (via the user device 110) to view and interact with a result (or solution) to the optimization problem. For example, the user device 110 may display the result of the optimization problem (via the human machine interface 230) to a user of the user device 110. Alternatively or in addition, the user of the user device 110 may interact with the result of the optimization problem (via the human machine interface 230) by outputting the result of the optimization problem to an additional device. Alternatively or in addition, the user may perform (via an electronic processor of the user device 110 executing instructions) additional processing, reporting, and the like based on the results (or solution). Furthermore, in some embodiments, the result of the optimization problem may be transmitted to an additional device and used to control the additional device. For example, the additional device may be a remote display device (for example, a pole sign, a billboard, and the like), which may receive the result and adjust displayed information accordingly. In some embodiments, the result may be automatically transmitted (over one or more communication networks) to the remote display device automatically. In other embodiments, a user may initiation the transmission of the result to the remote display device.

As noted above, the conventional approach to achieving feasibility of a set of constraints is impractical and inefficient from a computational perspective. Accordingly, to address these and other problems with existing approaches to achieving feasibility of a set of constraints whilst ensuring good performance of a set of constraints, embodiments described herein provide systems and methods of achieving feasibility of optimization constrains. The systems and methods described herein improve existing technology for solving optimization problems by allowing the problem to be calculated faster and, thus, using fewer resources (e.g., computing resources, etc.) while ensuring good performance. Accordingly, the methods and systems described herein represent an improvement to technology (for example, an improvement over existing technology (whether manual or automated) for solving optimization problems). Furthermore, it should be understood that the methods and systems may be described herein as being used to generate an optimal price, such as for fuel, the methods and systems described herein provide the improvements noted above for any type of optimization problem regardless of the specific result, parameters, and the like used with the problem. In particular, the embodiments described herein have applicability outside of the fuel industry and outside of generating optimal prices.

Figure 3:
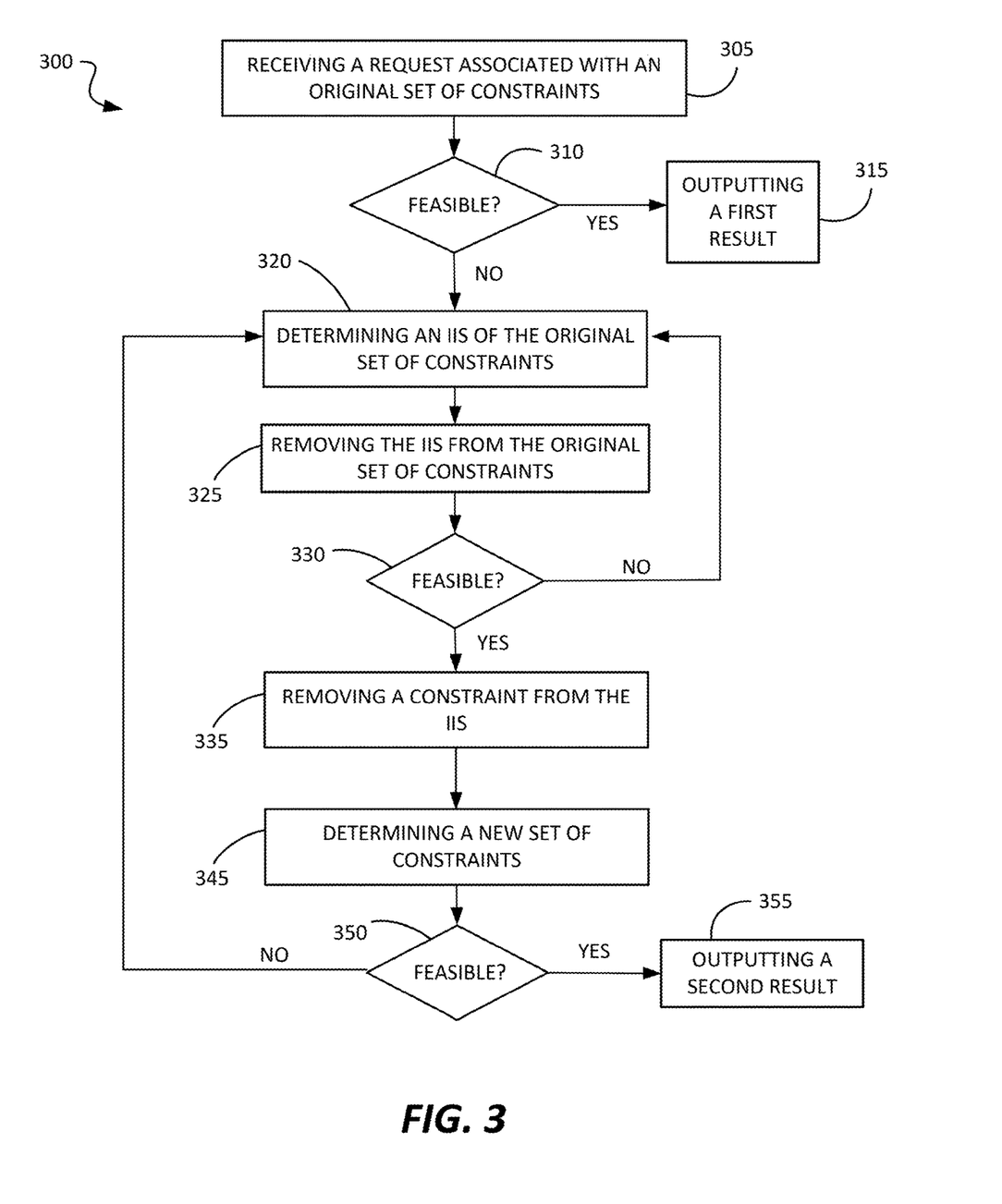
FIG. 3 is a flowchart illustrating a method of achieving feasibility of optimization constraints performed by the system of FIG. 2 according to some embodiments.

FIG. 3 is a flowchart illustrating a method 300 of achieving feasibility of optimization constraints using the system 100 of FIG. 1 according to some embodiments. The method 300 is described herein as being performed by the server 105 (the electronic processor 200 executing instructions). However, as noted above, the functionality performed by the server 105 (or a portion thereof) may be performed by other devices, including, for example, the user device 110 (via an electronic processor executing instructions).

As seen in FIG. 3, the method 300 includes receiving, with the electronic processor 200, a request associated with an original set of constraints (at block 305). The electronic processor 200 may receive the request from the user device 110 (through the communication network 125). The request may include the original set of constraints. A constraint represents one or more boundaries to optimization variables. Each constraint may be associated with a quantitative priority value. For example, a priority value may indicate the constraint as having a low-priority, a moderate-priority, a high-priority, another priority value, or a combination thereof. In such embodiments, the request includes a priority value associated with each constraint. For example, a user may interact with the user device 110 by providing a set of constraints (for example, the original set of constraints) and setting or assigning a priority value to each constraint included in the set of constraints. For example, in the context of the fuel industry, a given station of a mid-market retailer may wish to price lower than the premium brands in the local area but be a certain amount higher than the price of the loss-leading stations of nearby grocery supermarkets. In addition to this, the retailer may wish to impose a maximum price value, to ensure that a certain level of sales is maintained. Each of these constraints may have differing levels of priority (as assigned or set by the retailer).

In some embodiments, after receiving the request (at block 305), the electronic processor 200 determines whether the original set of constraints is feasible (at block 310). The electronic processor 200 may determine whether a set of constraints, such as the original set of constraints, is feasibly by applying an augmented linear programming ("LP") problem to the set of constraints. The electronic processor 200 may solve the augmented LP problem using a technique such as simplex, interior point, and the like. The augmented LP problem may be small from an optimization perspective. Therefore, the electronic processor 200 may solve the augmented LP problem in a small amount of time (for example, a couple of milliseconds). In some embodiments, the augmented LP problem is defined (or established) prior to receiving the request.

In response to determining that the original set of constraints is feasible (Yes at block 310), the method 300 proceeds to block 315. At block 315, the electronic processor 200 outputs a first result based on, for example, the original set of constraints. In some embodiments, the electronic processor 200 outputs the first result to the user device 110 for display via the human machine interface 230, storage within a memory of the user device 110, or a combination thereof. For example, the electronic processor 200 may output the first result to the user device 110 to enable a user to view and interact with the first result. Alternatively or in addition, the electronic processor 200 outputs the first result to an additional device for display, storage, or a combination thereof. For example, the additional device may be a remote display device (for example, a pole sign, a billboard, and the like), which may receive the result and adjust displayed information accordingly. In some embodiments, the result may be automatically transmitted (over one or more communication networks) to the remote display device automatically. In other embodiments, a user may initiation the transmission of the result to the remote display device. Thus, in some embodiments, the electronic processor 200 controls the additional device based on the first result.

Alternatively or in addition, in some embodiments, the electronic processor 200 stores the first result (for example, in the memory 205). In some embodiments, after determining that the original set of constraints is feasible (Yes at block 310), the electronic processor 200 determines one or more solutions using the original set of constraints, such as one or more optimal prices. Accordingly, the first result may include, for example, the original set of constraints, an indication that the original set of constraints is feasible, one or more solutions, a priority value associated with each constraint included in the original set of constraints, or a combination thereof.

In response to determining that the original set of constraints is infeasible (No at block 310), the method 300 proceeds to block 320. At block 320, the electronic processor 200 determines (or identifies) an IIS (for example, a first IIS) of the original set of constraints. As noted above, an IIS is a subset of the constraints that is itself infeasible but may be made feasible by removing any single constraint from the subset. The electronic processor 200 may determine an IIS using a deletion filter, an additive filter, or the like. After determining the IIS of the original set of constraints, the electronic processor 200 removes the IIS (for example, one or more constraints included in the IIS) from the original set of constraints (at block 325). The removal of the IIS from the original set of constraints results in a subset of remaining constraints (for example, a first subset of remaining constraints), where the subset of remaining constraints includes one or more constraints remaining in the original set of constraints after the IIS is removed from the original set of constraints.

The electronic processor 200 then determines whether the subset of remaining constraints, such as the first subset of remaining constraints, is feasible (at block 330). The electronic processor 200 may determine whether the subset of remaining constraints is feasible in a similar manner as described above with respect to determining whether the original set of constraints is feasible at block 310 of FIG. 3.

In response to determining that a subset of remaining constraints, such as the first subset of remaining constraints, is infeasible (No at block 330), the electronic processor 200 repeats blocks 320-325 with respect to the subset of remaining constraints determined to be infeasible. After repeating blocks 320-325 with respect to the subset of remaining constraints determined to be infeasible, the electronic processor 200 repeats block 330 with respect to a subsequent subset of remaining constraints from the previous subset of remaining constraints.

For example, when the electronic processor 200 determines that the first subset of remaining constraints is infeasible, the electronic processor 200 repeats blocks 320-325 with respect to the first subset of remaining constraints. In other words, the electronic processor 200 may determine a second IIS of the first subset of remaining constraints and remove the second IIS from the first subset of remaining constraints, in a similar manner as described above. The removal of the second IIS from the first subset of remaining constraints results in a second subset of remaining constraints, where the second subset of remaining constraints includes one or more constraints remaining in the first subset of remaining constraints after the second IIS is removed from the first subset of remaining constraints. After repeating blocks 320-325 with respect to the first subset of remaining constraints, the electronic processor 200 repeats block 330 with respect to the second subset of remaining constraints. In other words, the electronic processor 200 determines whether the second subset of remaining constraints is feasible.

In some embodiments, the electronic processor 200 performs the functionality of blocks 320-325 in a recursive manner until the electronic processor 200 determines that a subset of remaining constraints (for example, the first subset of remaining constraints, a second subset of remaining constraints, a third subset of remaining constraints, and the like) is feasible (Yes at block 330).

Accordingly, in some embodiments, the electronic processor 200 determines or identifies a disjoint collection of IISs (DCIIS), where no two IISs included in the DCIIS share a common constraint. In other words, the DCIIS includes a plurality of IISs (as determined by the electronic processor 200 as part of block 320 of FIG. 3). For example, the DCIIS may include a first IIS, a second IIS, a third IIS, an "n" IIS, and the like. The number of IISs included in the DCIIS may depend on the number of recursive passes through blocks 320-330.

When the electronic processor 200 determines that a subset of remaining constraints (for example, the first subset of remaining constraints, the second subset of remaining constraints and the like) is feasible (Yes at block 330), the method 300 proceeds to block 335. At block 335, the electronic processor 200 removes a constraint from the IIS. As noted above, an IIS may be made feasible by removing any single constraint included in the IIS. Accordingly, when the electronic processor 200 removes a constraint from an IIS, the electronic processor 200 is, ultimately, making the IIS feasible. The removal of the constraint from an IIS results in a feasible subset of remaining constraints of the IIS, wherein the feasible subset of remaining constraints includes one or more constraints remaining in the IIS after the removal of the constraint. In some embodiments, the electronic processor 200 determines what constraint to remove from the IIS based on a priority value associated with each constraint included in the IIS. For example, the electronic processor 200 may compare priority values for each constraint included in the IIS to identify or determine the constraint with the lowest priority value. The electronic processor 200 may remove the constraint with the lowest priority value.

As noted above, in some embodiments, the electronic processor 200 determines multiple IISs (for example, as the DCIIS). In such embodiments, the electronic processor 200 removes a constraint from each of the IISs. For example, the electronic processor 200 may remove a first constraint from the first IIS, a second constraint from the second IIS, a third constraint from a third IIS, and the like. In other words, the electronic processor 200 makes each of the IISs feasible by removing a constraint from each of the IISs. The removal of a constraint from each of the IISs may result in, for example, a first feasible subset of remaining constraints of the first IIS, a second feasible subset of remaining constraints of the second IIS, and the like.

After removing a constraint from one or more IIS, the electronic processor 200 determines a new set of constraints (at block 345). The electronic processor 200 may determine the new set of constraints by combining all of the remaining constraints within the now-feasible IISs (for example, a first feasible subset of remaining constraints of a first IIS, a second feasible subset of remaining constraints of a second IIS, and the like) with the one or more subsets of remaining constraints (or subsequent subset of remaining constraints) determined to be feasible at block 330. The electronic processor 200 then determines whether the new set of constraints is feasible (at block 350). The electronic processor 200 may determine whether the new set of constraints is feasible in a similar manner as described above with respect to determining whether the original set of constraints is feasible at block 310 of FIG. 3.

In response to determining that the new set of constraints is infeasible (No at block 350), the electronic processor 200 repeats blocks 320-345 with respect to the new set of constraints determined to be infeasible (in place of the original set of constraints). In other words, the electronic processor 200 repeats blocks 320-345 with respect to the new set of constraints determined to be infeasible to determine a subsequent new set of constraints. After repeating blocks 320-345, the electronic processor 200 repeats block 350 with respect to the subsequent new set of constraints. In some embodiments, the electronic processor 200 repeats blocks 320-345 in a recursive manner until the electronic processor 200 determines that a subsequent or outstanding new set of constraints (for example, a first new set of constraints, a second new set of constraints, or an "n" new set of constraints) is feasible (Yes at block 350).

In response to determining that the new set of constraints is feasible (Yes at block 350), the electronic processor 200 may output a second result (at step 355). In some embodiments, the second result is based on the new set of constraints (or a subsequent new set of constraints). In some embodiments, the electronic processor 200 outputs the second result to the user device 110 for display via the human machine interface 230, storage within a memory of the user device 110, or a combination thereof. For example, the electronic processor 200 may output the second result to the user device 110 to enable a user to view and interact with the second result. Alternatively or in addition, the electronic processor 200 outputs the second result to an additional device for display, storage, or a combination thereof. In some embodiments, the electronic processor 200 controls the additional device based on the second result. Alternatively or in addition, in some embodiments, the electronic processor 200 stores the second result (for example, in the memory 205). In some embodiments, after determining that the new set of constraints is feasible (Yes at block 350), the electronic processor 200 determines one or more solutions using the new set of constraints, such as one or more optimal prices. Accordingly, the second result may include, for example, the original set of constraints, the new set of constraints, an indication that the new set of constraints is feasible, one or more solutions, a priority value associated with each constraint, an indication (or listing) of the constraint removed from each IIS (for example, a first constraint, a second constraint, a third constraint, and the like), or a combination thereof.

Due to the recursive nature of the methods described herein, the embodiments described herein guaranteed to identify a subset of constraints that are feasible (for example, all but one of the constraints may be removed in the worst case, where every constraint is infeasible with all the others constraints).

In some embodiments, the methods and systems described herein may be implemented within the context of a fully automated optimization system, such as a fully automated fuel pricing optimization system. Within this context, a fuel retailer may provide an original set of constraints (for example, one or more desired pricing constraints) for each site (including the priorities values of the constraints). The retailer may also provide a record of historical sales and associated prices (for each site). This record may be used to build a demand model for optimization through an automated ingestion pipeline. When a request for price generation is submitted, the system may automatically determine a set of feasible pricing constraints (for example, the new set of constraints) for each site. The system may automatically initiate a price optimization process using the set of feasible pricing constraints. For example, the system may automatically generate one or more optimal prices based on the feasible pricing constraints, defined business objectives, current market conditions, and the like. The system may automatically transmit or output the optimal prices directly to a retailer's point of service (POS) system for display on, for example, a station pole-sign. Alternatively or in addition, the system may make the optimal prices available to the retailer for review (for example, prior to being transmitted to the retailer's point of service system for display).

Alternatively or in addition, when one or more desired pricing constraint is dropped in order to achieve feasibility at a certain site, the system may generate and transmit an alert (for example, the second result) to the retailer. For example, the alert may inform the retailer that the original set of desired pricing constraints was infeasible as a single group and identify the one or more desired pricing constraints that were removed to achieve feasibility. A retailer may use the information included in the alert for monitoring purposes. For example, a retailer may assess which constraints are often the cause of infeasibility. Such assessments and monitoring enables a retailer to make decisions or modifications such that conflicts between constraints may be reduced in the future.

Furthermore, although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

What is claimed is:

1. A system for improving feasibility of optimization constraints by substituting a naïve brute-force approach and executing an augmented linear programming algorithm, the system comprising:

hardware processor configured to execute software to:
receive a request to determine an irreducible infeasible subset of an original set of constraints;
execute an augmented linear programming algorithm to check for feasibility of the original set of constraints within a couple of milliseconds;
identify, within the original set of constraints, disjoint constraints in addition to linear constraints of the augmented linear programming algorithm;
substitute a naïve brute-force approach for a determination of a disjoint collection of irreducible infeasible subsets corresponding to the disjoint constraints, achieved by:
(a) determining, using an additive or deletion filter of the software, the irreducible infeasible subset of the original set of constraints for inclusion in the disjoint collection of irreducible infeasible subsets, wherein no two irreducible infeasible subsets included in the disjoint collection of irreducible infeasible subsets share a common constraint,
(b) removing each irreducible infeasible subset included in the disjoint collection of irreducible infeasible subsets from the original set of constraints resulting in a subset of remaining constraints of the original set of constraints,
recursively repeating (a) and (b) while the subset of remaining constraints of the original set of constraints is infeasible, up to a maximum of a squared logarithm of base two of feasibility checks for the irreducible infeasible subsets without considering all other subsets containing the constraints in the irreducible infeasible subset,
determine, after the recursively repeating, that the subset of remaining constraints of the original set of constraints is feasible;
remove a constraint from each irreducible infeasible subset included in the disjoint collection of irreducible infeasible subsets, that has a lowest priority value among each irreducible infeasible subset, resulting in a collection of feasible subsets of remaining constraints of the irreducible infeasible subsets, and
determine a new set of constraints, wherein the new set of constraints includes the feasible subset of remaining constraints and the collection of feasible subsets of remaining constraints of the irreducible infeasible subsets; and
in response to determining the new set of constraints, automatically transmit, over one or more communication networks, a result based on the new set of constraints to a remote display device, and output the result on the remote display device.

2. The system of claim 1, wherein the result indicates the constraint removed from each irreducible infeasible subset included in the disjoint collection of irreducible infeasible subsets.

3. The system of claim 1, wherein the hardware processor is further configured to store the new set of constraints.

4. The system of claim 1, wherein the hardware processor is further configured to determine at least one solution based on the new set of constraints, wherein the result includes the at least one solution.

5. A computer implemented method for improving feasibility of optimization constraints by substituting a naïve brute-force approach and executing an augmented linear programming algorithm, the method comprising:

receiving, by a hardware processor, a request to determine an irreducible infeasible subset of an original set of constraints;

executing, by the hardware processor, an augmented linear programming algorithm to check for feasibility of the original set of constraints within a couple of milliseconds;

identifying, by the hardware processor, within the original set of constraints, disjoint constraints in addition to linear constraints of the augmented linear programming algorithm;

substituting a naïve brute-force approach for a determination of a disjoint collection of irreducible infeasible subsets corresponding to the disjoint constraints, achieved by:

(a) determining, using an additive or deletion filter of software executed by the hardware processor, the irreducible infeasible subset of the original set of constraints for inclusion in the disjoint collection of irreducible infeasible subsets, wherein no two irreducible infeasible subsets included in the disjoint collection of irreducible infeasible subsets share a common constraint, (b) removing, by the hardware processor, each irreducible infeasible subset included in the disjoint collection of irreducible infeasible subsets from the original set of constraints resulting in a subset of remaining constraints of the original set of constraints, recursively repeating (a) and (b), by the hardware processor, while the subset of remaining constraints of the original set of constraints is infeasible, up to a maximum of a squared logarithm of base two of feasibility checks for the irreducible infeasible subsets without considering all other subsets containing the constraints in the irreducible infeasible subset, determining, by the hardware processor, after the recursively repeating, that the subset of remaining constraints of the original set of constraints is feasible, removing, by the hardware processor, a constraint from each irreducible infeasible subset included in the disjoint collection of irreducible infeasible subsets, that has a lowest priority value among each irreducible infeasible subset, resulting in a collection of feasible subsets of remaining constraints of the irreducible infeasible subsets, and determining, by the hardware processor, a new set of constraints, wherein the new set of constraints includes the feasible subset of remaining constraints and the collection of feasible subsets of remaining constraints of the irreducible infeasible subsets; and in response to determining the new set of constraints, automatically transmitting, by the hardware processor over one or more communication networks, a result based on the new set of constraints to a remote display device, and output the result on the remote display device.

6. The method of claim 5, wherein the result indicates the constraint removed from each irreducible infeasible subset included in the disjoint collection of irreducible infeasible subsets.

7. The method of claim 5, further comprising:
storing, by the hardware processor, the new set of constraints.

8. The method of claim 5, further comprising:
determining, by the hardware processor, at least one solution based on the new set of constraints, wherein the result includes the at least one solution.

9. A non-transitory computer-readable medium storing instructions executable a hardware processor to perform a set of functions, the set of functions comprising:

receiving, a request to determine an irreducible infeasible subset of an original set of constraints;

executing, an augmented linear programming algorithm to check for feasibility of the original set of constraints within a couple of milliseconds;

identifying, within the original set of constraints, disjoint constraints in addition to linear constraints of the augmented linear programming algorithm;

substituting a naïve brute-force approach for a determination of a disjoint collection of irreducible infeasible subsets corresponding to the disjoint constraints, achieved by:

(a) determining, using an additive or deletion filter of software executed by the hardware processor, the irreducible infeasible subset of the original set of constraints for inclusion in the disjoint collection of irreducible infeasible subsets, wherein no two irreducible infeasible subsets included in the disjoint collection of irreducible infeasible subsets share a common constraint, (b) removing, each irreducible infeasible subset included in the disjoint collection of irreducible infeasible subsets from the original set of constraints resulting in a subset of remaining constraints of the original set of constraints, recursively repeating (a) and (b), while the subset of remaining constraints of the original set of constraints is infeasible, up to a maximum of a squared logarithm of base two of feasibility checks for the irreducible infeasible subsets without considering all other subsets containing the constraints in the irreducible infeasible subset, determining, after the recursively repeating, that the subset of remaining constraints of the original set of constraints is feasible, removing, a constraint from each irreducible infeasible subset included in the disjoint collection of irreducible infeasible subsets, that has a lowest priority value among each irreducible infeasible subset, resulting in a collection of feasible subsets of remaining constraints of the irreducible infeasible subsets, and determining, a new set of constraints, wherein the new set of constraints includes the feasible subset of remaining constraints and the collection of feasible subsets of remaining constraints of the irreducible infeasible subsets; and in response to determining the new set of constraints, automatically transmitting, over one or more communication networks, a result based on the new set of constraints to a remote display device, and output the result on the remote display device.

10. The non-transitory computer-readable medium of claim 9, wherein the result indicates the constraint removed from each irreducible infeasible subset included in the disjoint collection of irreducible infeasible subsets.

11. The non-transitory computer-readable medium of claim 9, wherein the set of functions further comprise:
storing the new set of constraints.

12. The non-transitory computer-readable medium of claim 9, wherein the set of functions further comprise:
  determining, at least one solution based on the new set of constraints, wherein the result includes the at least one solution.

\* \* \* \* \*

UNITED STATES PATENT AND TRADEMARK OFFICE
CERTIFICATE OF CORRECTION

| | |
|---|---|
| PATENT NO. | : 11,651,305 B2 |
| APPLICATION NO. | : 16/807467 |
| DATED | : May 16, 2023 |
| INVENTOR(S) | : Mark Pearce et al. |

It is certified that error appears in the above-identified patent and that said Letters Patent is hereby corrected as shown below:

On the Title Page

Item (12), replace:
"Owen et al."
With:
--Pearce et al.--

Under (72) inventors, replace inventors:
"Gareth Owen, Manchester (GB);
Benjamin Pickering, Manchester (GB);
David Leedal, Manchester (GB)"

With:
--Mark Pearce, Stockport (GB);
Gareth Owen, Manchester (GB);
Benjamin Pickering, Manchester (GB);
David Leedal, Manchester (GB)--

Signed and Sealed this
Eighth Day of October, 2024

Katherine Kelly Vidal
*Director of the United States Patent and Trademark Office*